US008020098B2

(12) United States Patent
Katayama

(10) Patent No.: US 8,020,098 B2
(45) Date of Patent: Sep. 13, 2011

(54) VIDEO ANALYSIS SYSTEM OF SWING MOTION

(75) Inventor: Hide Katayama, Tokyo (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 1042 days.

(21) Appl. No.: 11/387,737

(22) Filed: Mar. 24, 2006

(65) Prior Publication Data

US 2006/0281060 A1 Dec. 14, 2006

(30) Foreign Application Priority Data

Mar. 24, 2005 (JP) ................. P2005-086004

(51) Int. Cl.
*G06F 3/00* (2006.01)
(52) U.S. Cl. ........................ 715/720; 715/722
(58) Field of Classification Search .......... 715/261, 715/720, 722
See application file for complete search history.

(56) References Cited

U.S. PATENT DOCUMENTS

| | | | | |
|---|---|---|---|---|
| 5,249,967 A | * | 10/1993 | O'Leary et al. | 434/247 |
| 5,697,791 A | * | 12/1997 | Nashner et al. | 434/247 |
| 5,823,786 A | * | 10/1998 | Easterbrook | 434/247 |
| 5,857,855 A | | 1/1999 | Katayama | |
| 5,867,229 A | * | 2/1999 | Stevens | 348/722 |
| 5,868,578 A | * | 2/1999 | Baum | 434/247 |
| 5,947,742 A | * | 9/1999 | Katayama | 434/247 |
| 6,042,492 A | * | 3/2000 | Baum | 473/453 |
| 6,560,399 B2 | | 5/2003 | Sato et al. | |
| 6,567,536 B2 | * | 5/2003 | McNitt et al. | 382/107 |
| 6,648,769 B2 | * | 11/2003 | Lee et al. | 473/223 |
| 7,048,638 B2 | * | 5/2006 | Novotny | 473/219 |
| 7,283,647 B2 | * | 10/2007 | McNitt | 382/107 |
| 7,542,130 B2 | * | 6/2009 | Saegusa | 356/28 |
| 2001/0031684 A1 | * | 10/2001 | Ervin | 482/14 |
| 2002/0064764 A1 | * | 5/2002 | Fishman et al. | 434/252 |
| 2004/0152058 A1 | * | 8/2004 | Browne et al. | 434/258 |
| 2004/0198525 A1 | * | 10/2004 | Bender | 473/207 |

(Continued)

FOREIGN PATENT DOCUMENTS

| | | |
|---|---|---|
| JP | 10-304299 A | 11/1998 |
| JP | 2001-516233 A | 9/2001 |
| JP | 2001-293120 A | 10/2001 |
| JP | 2002-346012 A | 12/2002 |

OTHER PUBLICATIONS

Ming et al."Motion Control Skill in Human Hyper Dynamic Manipulation".Copyright Date: Aug. 2001.*

(Continued)

*Primary Examiner* — Doug Hutton
*Assistant Examiner* — Soumya Dasgupta
(74) *Attorney, Agent, or Firm* — Sughrue Mion, PLLC

(57) ABSTRACT

A video analysis system for analyzing video of a swing motion including an imaging unit that records video of the swing motion, an impact detection unit, a video display unit, a control unit, and a personal computer. The control unit activates functions, remotely from the personal computer, and performs functions, including receiving the video of the swing motion, receiving an impact detection signal, recording the video of the swing motion, determining an impact time based on the impact detection signal and recording images of the swing motion for a predetermined time period that includes the impact with the ball, displaying the video of the swing motion on the video display unit, slowing down replay speed of the video of the swing motion to be lower than an actual speed of the recorded swing, temporarily stopping the video, and switching video replay between a forward mode and a backward mode.

15 Claims, 6 Drawing Sheets

U.S. PATENT DOCUMENTS

2004/0219964 A1* 11/2004 Bleckley et al. .............. 463/13
2004/0229708 A9* 11/2004 Novotny ..................... 473/257
2005/0054457 A1*  3/2005 Eyestone et al. ............ 473/221
2006/0121999 A1*  6/2006 Bender ...................... 473/207
2007/0111767 A1*  5/2007 Brown et al. ................. 463/1

OTHER PUBLICATIONS

Yoon et al. "Neural Networks for Golf Swing Analysis from Weight Shift." Copyright Date: 1994.*

Japanese Office Action dated Apr. 30, 2008.

* cited by examiner

VIDEO ANALYSIS SYSTEM OF SWING MOTION

CROSS-REFERENCE TO RELATED APPLICATION

This application is based upon and claims the benefit of priority from the Japanese Patent Application No.2005-86004 filed on Mar. 24, 2005; the entire contents of which are incorporated herein by reference.

BACKGROUND OF THE INVENTION

1. Field of the Invention

This invention relates to a video analysis system of swing motion in sports of hitting a ball, such as golf and baseball.

2. Description of the Related Art

Hitherto, in golf, for a golfer to improve his or her swing motion for improving the golf skill, generally the golfer has consulted a golf teacher called an instructor about his/her swing motion and has gotten an instructor's advice on the swing motion; it has been a common practice for the golfer to take such lessens in a golf school. In the golf school, it is also a common practice that the swing of a student golfer is recorded with a general-purpose video camera and that the student golfer watches the video to enable the student to easily understand his/her weak point.

However, generally the swing motion can be recorded only from one direction with the general-purpose video camera, and it is troublesome to identify the swing motion from a recording medium and display the video of the swing motion.

To overcome this disadvantage, an apparatus has been proposed in which golfer's swing motion is recorded with two or three video cameras and is displayed on two monitors using a switcher or golfer's swing motion is recorded on video tape. However, a line, etc., cannot be drawn on the monitor screen and it is not easy to operate the video.

U.S. Pat. Nos. 5,857,855 and 5,947,742 have proposed a method including recording an instructor's swing motion and a student's swing motion as video images, replaying the video images on the same screen of a video display without superposing them and comparing and checking the two video images simultaneously to allow the student to understand a difference between the instructor's swing motion and the student's swing motion. However, no apparatus or technique for enabling students to easily compare the two video images has been proposed.

Further, various systems for connecting an apparatus for recording swing motion and a personal computer to analyze the golfer's swing motion have been proposed. However, those systems are premised on use of a personal computer. Therefore, there arises a problem that users are required to have a preliminary knowledge about basic software such as Windows (registered trademark), etc., to operate those systems.

SUMMARY OF THE INVENTION

The invention provides a video analysis system of swing motion, which can be operated by the a user having no preliminary knowledge of a basic software, can easily determine and display a video of swing motion and makes it possible to conduct more advanced swing analysis using a personal computer as required or depending on the capability of an operator.

According to an aspect of the invention, a video analysis system of swing motion, for analyzing video of swing motion for hitting a ball, includes an imaging unit that images video of swing motion, an impact detection unit that detects impact, a control unit and a video display unit. The control unit has functions (a) to (h):

(a) a function of receiving the video of the swing motion from the imaging unit;

(b) a function of receiving an impact detection signal from the impact detection unit;

(c) a function of recording the video of swing motion received from the imaging unit into the control unit;

(d) a function of—when the control unit records into the control unit the video of the swing motion received from the imaging unit—determining an impact time based on the impact detection signal received from the impact detection unit, to record images of the swing motion for a predetermined time period containing the impact time;

(e) a function of displaying the video of the swing motion received from the imaging unit, on the video display unit;

(f) a function of slowing down replay speed of the video of the swing motion to be lower than an actual swing speed during the displaying of the video of the swing motion on the video display unit;

(g) a function of temporarily stopping replying the images during the displaying of the video of the swing motion on the video display unit; and (h) a function of switching image replay between a forward mode and a backward mode during the displaying of the video of the swing motion on the video display unit.

According to this configuration, since the control unit has the functions (a) to (h), the video of the swing motion of hitting a ball can be analyzed without using a personal computer. Also, if necessary or an operator has advanced capability, advanced swing analysis may be conducted using a personal computer. Further, the control unit may identify the impact time based on the impact detection signal received from the impact detection unit and records the video of the swing motion for the predetermined time period containing the impact time. Therefore, the video of swing motion can be easily determined and displayed.

DETAILED DESCRIPTION OF EMBODIMENTS OF THE INVENTION

Figure 1:
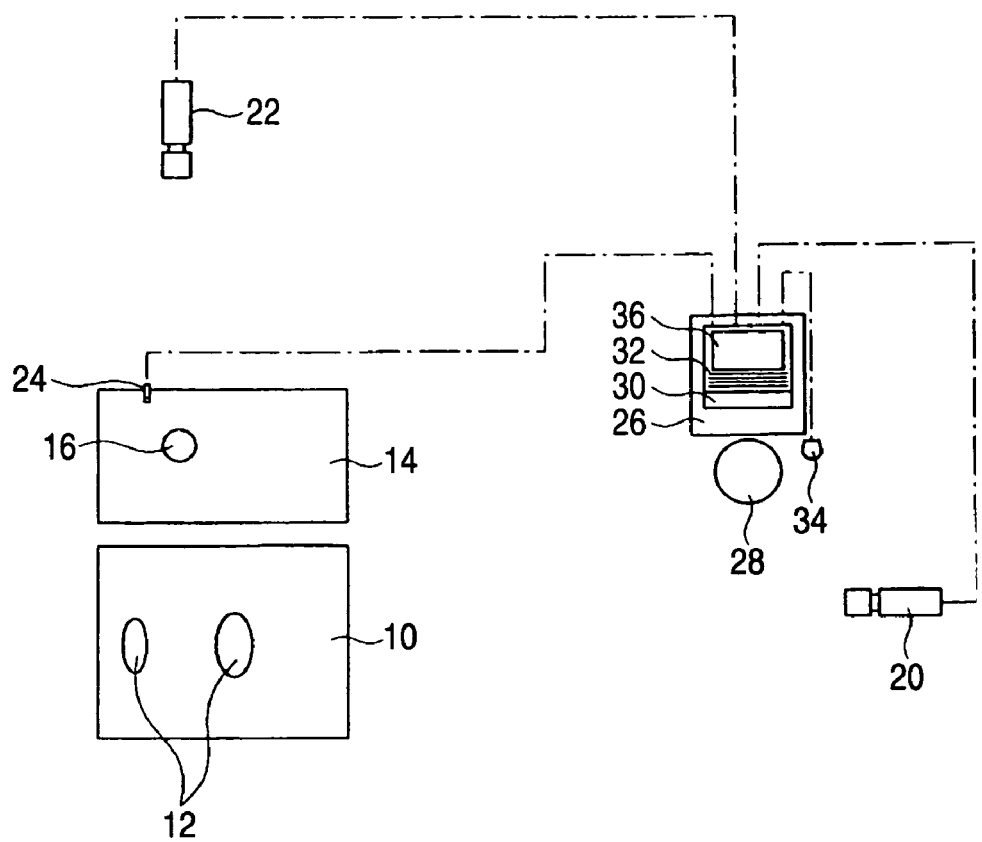
FIG. 1 is a plan view to show an example of a video analysis system of swing motion according to an embodiment of the invention.

Although embodiments of the invention will be described with reference to the accompanying drawings, the invention is not limited to the following examples. FIG. 1 is a plan view to show an example of a video analysis system of swing motion according to an embodiment of the invention. In FIG. 1, numeral 10 denotes a stance mat on which a golfer who hits a golf ball stands. Numeral 12 denotes a stance position. Numeral 14 denotes a shot mat where a ball is set. Numeral 16 denotes a tee position.

In FIG. 1, numeral 20 denotes a first camera for imaging a golfer from the rear. Numeral 22 denotes a second camera for imaging a golfer from the front. In this system, the first camera 20 and the second camera 22 function as an imaging unit that images video of swing motion. The first camera 20 and the second camera 22 are shutter-type CCD cameras and are set to appropriate heights with tripods.

In FIG. 1, numeral 24 denotes a pin-type sensor microphone (hereinafter simply referred to as "microphone") installed in the proximity of the tee position 16 on the shot mat 14. The microphone 24 is provided to detect impact sound. In this system, the microphone 24 functions as an impact detection unit that detects impact.

In FIG. 1, numeral 26 denotes a table. Numeral 28 denotes a chair. Numeral 30 denotes a controller with video memory (hereinafter simply referred to as "controller") placed on the table 26. Numeral 32 denotes a notebook personal computer (notebook PC) placed on the controller 30. Numeral 34 denotes a foot switch. The foot switch 34 is a start switch. When a user presses the switch 34 with his/her foot, the controller 30 starts to capture video.

The controller 30 is electrically connected to the first camera 20, the second camera 22, the microphone 24, the notebook PC 32, and the foot switch 34. In this system, the controller 30 functions as a control unit. Also, a monitor 36 of the notebook PC 32 functions as a video display unit. The clock frequency of a CPU (central processing unit) of the notebook PC 32 is 1 GHz or more. Video of swing motion is transmitted from the controller 30 to the notebook PC 32 with USB 2.0 at data transmission speed of 480 Mbps.

The controller 30 has an input device such as buttons 38, 40, 42, 44, 46, 48 and switches 50, 52 54 described later, a memory, and a CPU (central processing unit). The memory is a volatile memory such as DRAM. In this embodiment, DRAM is used as the memory of the controller 30 and has 512M bytes (or more) in capacity. Generally, size of video data is relatively large and a hard disk device is used to store the video data transmitted from a camera. On the other hand, DRAM is quite higher than hard disk devices in access speed. In order to quickly write and read the video data, the controller 30 of this embodiment has the memory without a hard disk device.

The controller 30 has the following functions (a) to (m):

(a) a function of receiving videos of swing motion from the first camera 20 and the second camera 22;

(b) a function of receiving an impact detection signal (impact sound detection signal) from the microphone 24;

(c) a function of recording the video of the swing motion received from the first camera 20 and the second camera 22;

(d) a function of—when the control unit records the video of the swing motion received from the first camera 20 and the second camera 22—determining the impact time based on the impact detection signal received from the microphone 24 and recording the video of the swing motion for a predetermined time period containing the impact time;

(e) a function of displaying the video of the swing motion received from the first camera 20 and the second camera 22 on the monitor 36;

(f) a function of slowing down replay speed of the video of the swing motion to be lower than the actual swing speed during the displaying of the video of the swing motion on the monitor 36;

(g) a function of temporarily stopping replaying the video during the displaying of the video of the swing motion on the monitor 36;

(h) a function of switching video replay between a forward mode and a backward mode during the displaying of the video of the swing motion on the monitor 36;

(i) a function of adjusting the predetermined time period when the controller 30 records the video of the swing motion by the function (d);

(j) a function of switching among a first video of the first camera, a second video of the second camera, and a third video provided by center wiping of the first and second videos, to display the switched video on the monitor 36;

(k) a function of switching between a live image captured at present with the first camera 20 and the second camera 22 and a memory video recorded in the controller 30 for displaying the switched video on the monitor 36;

(l) a function of erasing the recorded video of the swing motion; and (m) a function of transmitting the video of the swing motion to the notebook PC 32.

Figure 2:
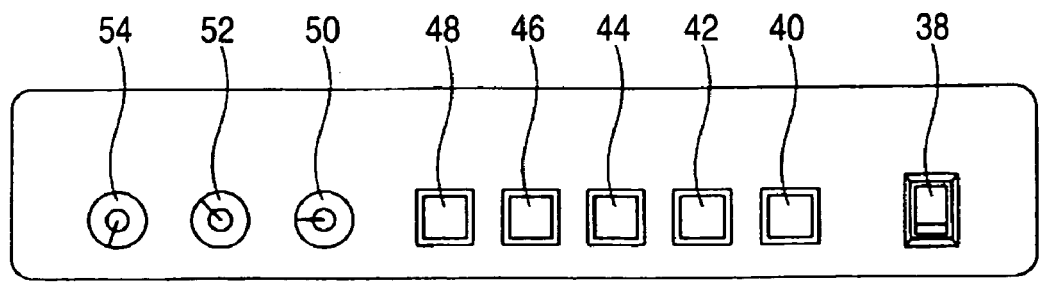
FIG. 2 is a front view of a controller of the system shown in FIG. 1.

In this example, the controller 30 is provided on its front with six push button switches 38, 40, 42, 44, 46, and 48 and three rotary dial switches 50, 52, and 54, as shown in FIG. 2. The switch 38 is a power switch. The switch 40 is a start switch for activating the function of receiving the video of swing motion from the first and second cameras 20, 22 (the function (a)). When the switch 40 is depressed, capturing video is started. The switch 42 is a forcible termination switch. When the switch 42 is depressed, capturing the video is terminated.

The switch 44 is a live video/memory vide changeover switch for activating the function of switching between the live image captured at present with the first and second cameras 20, 22 and the memory image recorded in the controller 30, to display the switched video on the video display unit (the function (k)). The switch 46 is a memory-image forward/backward changeover switch for activating the function of switching video replay between a forward mode and a backward mode (the function (h)). The switch 48 is a memory image replay/stop changeover switch for activating the function of temporarily stopping replaying the video of the swing motion (the function (g)).

The switch 50 is a slow replay switch for providing the function of slowing down replay speed of the video of the swing motion to be lower than the actual swing speed (the function (f)). The switch 52 is a camera display changeover switch for providing the function of switching the first video of the first camera, the second video of the second camera, and the third video provided by center wiping of the first and second videos to display the switched video on the video display unit (the function (j)).

The switch 54 is a trigger delay switch for adjusting length of time in which video is overwritten into the memory after the impact time, to thereby adjust distribution of numbers of frames of the video before the impact and numbers of frames of the video after the impact in the whole image. In this example, the switch 54 implements the function (i). Specifically, in order for the controller 30 to determine the impact time based on the impact detection signal received from the microphone 24 and to record the video of the swing motion for the predetermined time period, the switch 54 is provided for adjusting the predetermined time period so that the predetermined time period is a sum of 1.3 to 2.2 seconds before the impact time and 0.8 to 2.2 seconds after the impact time. It is adequate that the total time (predetermined time period) usually is set to about 3 to 4 seconds.

Software having the following functions (1) to (12) is installed in the notebook PC 32:

(1) a function, by presetting frame number of video at an address position, frame number of video at a top position, frame number of video at an impact position, and frame number of video at a finish position in an image memory, and frame number of video at a finish position in an image memory, of capturing four types of images at the address position, at the top position, at the impact position, and at the finish position from the video of the swing motion received from the controller 30 in response to a single menu click operation, and displaying the four captured images on the same screen of the monitor 36;

(2) a function of arranging the four captured images in a predetermined display format when displaying the four images on the same screen of the monitor 36 while quickly generating a comment on the video of the swing motion by calling the comment from a previously created comment file and adding and registering a newly created comment to the comment file, and displaying the comment in the display format;

(3) a function of making it possible to enter a name of a golfer and a name of an instructor in the display format and to record the once entered names of the golfer and the instructor for later calling;

(4) a function of superposing two images in the video of the swing motion on each other on the same screen and making one of the images translucent, to thereby enable a user to recognize the two images on the same screen;

(5) a function of switching between the video from the first camera 20 or the second camera 22 and the videos from the both cameras 20 and 22 for display;

(6) a function of receiving a first video provided by the first camera 20 and a second video provided by the second camera 22, from the controller 30 and aligning top positions of the first and second videos, thereby displaying the first and second videos in synchronous with each other;

(7) a function of displaying a scale on the screen on which the video of the swing motion is displayed;

(8) a function of displaying a line selected from among a circle, an ellipse, a straight line, a rectangle, a free-form curve, and a grid line on the screen on which the video of the swing motion is displayed;

(9) a function of setting three points within the screen on which the video of the swing motion is displayed and calculating and displaying an angle between two straight lines connecting the three points;

(10) a function of saving a file of the video of the swing motion received from the controller 30;

(11) a function of compressing and saving a file of the video of the swing motion received from the controller 30.

(12) a function of making a printer print the screen on which the video of the swing motion is displayed.

When a video of golf swing motion is performed using the system of this example, the first camera 20 and the second camera 22 capture the swing motion of a golfer who stands on the stance mat 10 and hits a golf ball set at the tee position 16 of the shot mat 14. The controller 30 acquires the videos from the first camera 20 and the second camera 22 and records the video of the swing motion for the predetermined time containing the impact time. Then, the video of the swing motion is analyzed using the various functions of the controller 30 and the various functions of the software of the notebook PC 32.

Specifically, the video analysis is performed according to the following procedures, for example:

(i) before starting swing, a golfer depresses the foot switch 34 or the start switch 40 to clear (erase) video data recorded in the controller 30 and start video capture (overwrite) operation into the video memory in sequence.

(ii) when a club hits a ball, the microphone 24 detects an impact sound and sends an impact detection signal to the controller 30. The controller 30 determines the impact time based on the impact detection signal received from the microphone 24. The controller 30 determines the distribution of numbers of frames of the videos before and after the impact based on record time period after the impact adjusted by the switch 54 and the capacity of the video memory (video memory element), and then records the video of the swing motion.

(iii) the video recorded in the memory is operated appropriately using the switches and buttons of the controller 30, to thereby analyze the video of the swing motion.

(iv) if necessary, the video recorded in the controller 30 (memory) may be automatically transmitted through the USB communication interface to the notebook PC 32 according to transmission setting previously made in the software of the controller 30, or the note PC 32 transmits a command menu to the controller 30. Thereby, the video of the swing motion is appropriately transmitted to the notebook PC 32 and is recorded in the notebook PC 32. As a result, a more advanced analysis of the video of the swing motion can be performed.

Analysis examples of the swing motion by the controller 30 and the software of the notebook PC 32 will be discussed with reference to the accompanying drawings, but the analysis of the video of the swing motion by this system is not limited to the analysis examples described below. Each function of the software described above can be activated when a user clicks on an appropriate screen button, for example.

Analysis Example Based on the Function (j)

Figure 3:
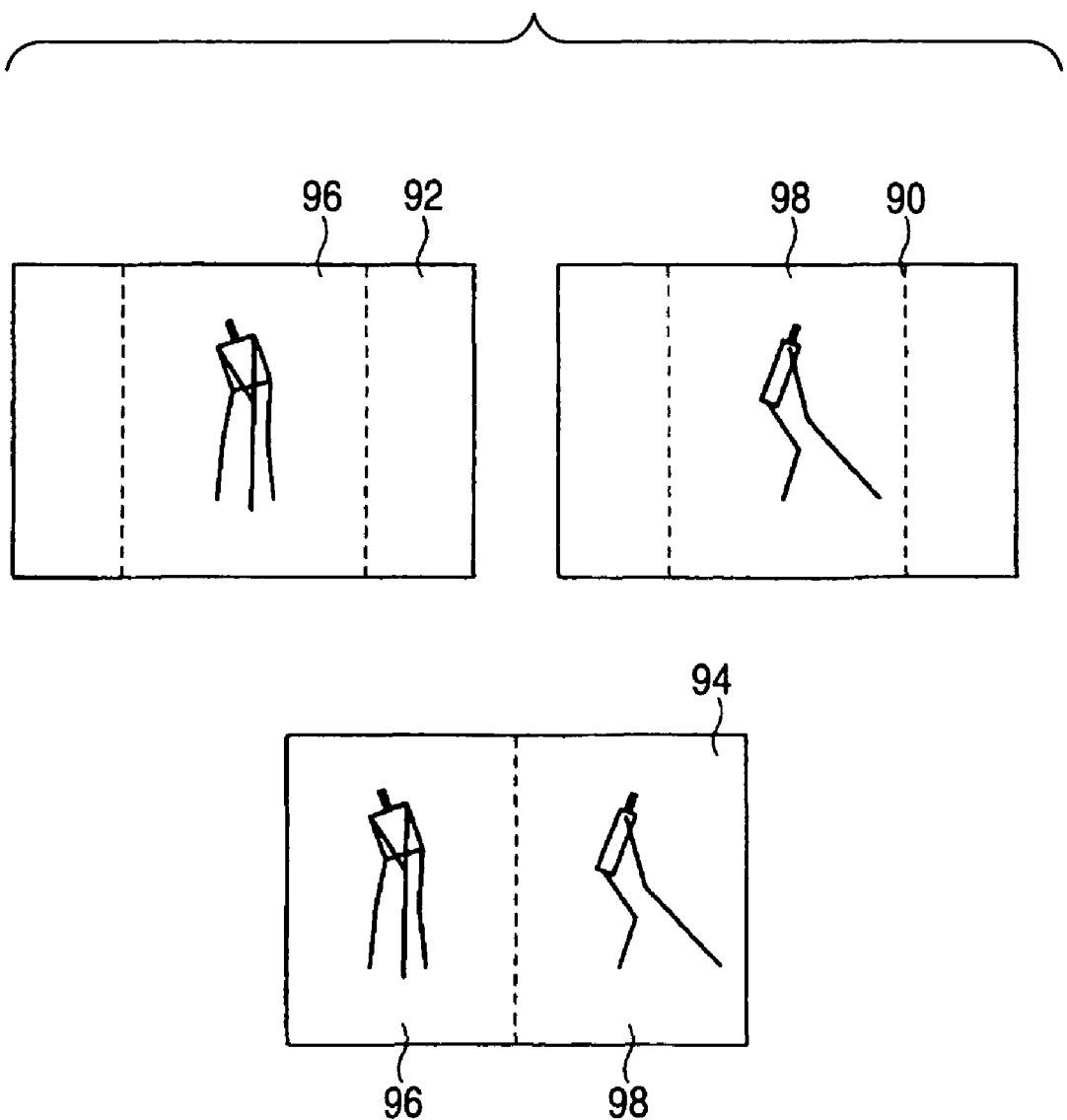
FIG. 3 is an explanatory view showing an analysis example of swing motion by the system shown in FIG. 1.

As shown in FIG. 3, for example, a first video 90 of the first camera 20, a second video 92 of the second camera 22, and a third video 94 provided by center wiping of the first video 90 and the second video 92 are switched to display the switched video on the monitor 36. The center wiping refers to processing of cutting out and pasting (wiping) center portions (centers) 96 and 98 of the full images. The center wiping includes center wiping with respect to a vertical direction in the paper of FIG. 3 and center wiping with respect to a lateral direction in the paper of FIG. 3. The center wiping in this example is center wiping with respect to the lateral direction.

Analysis Example Based on the Functions (1), (2), and (3)

Figure 4:
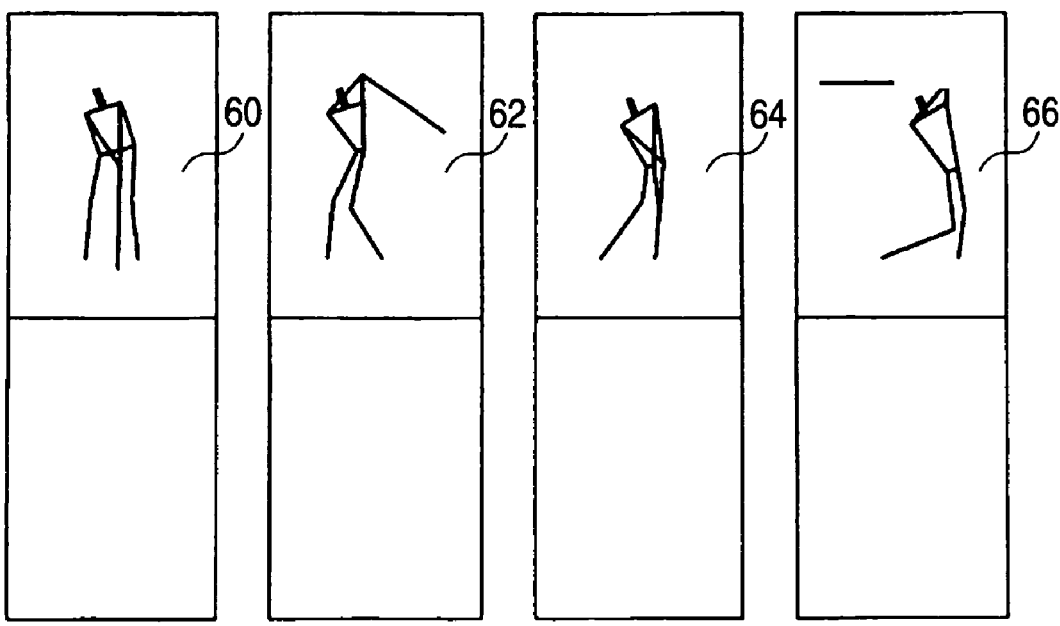
FIG. 4 is an explanatory view showing an analysis example of swing motion by the system shown in FIG. 1.

As shown in FIG. 4, an image 60 at the address position, an image 62 at the top position, an image 64 at the impact position, and an image 66 at the finish position are captured from the video of the swing motion received from the controller 30 according to a single menu click operation and the four captured images are displayed on the same screen of the monitor 36. In this case, the four images are arranged in a predetermined display format 68. Also, a comment on the video of the swing motion is quickly created by utilizing a previously created comment file and/or adding a newly created comment to the comment file, to display the created comment in a comment field 70 of the display format 68. Also, it is made possible to enter the names of a golfer and an instructor in the display format 68 and record the once entered names of the golfer and the instructor for later calling. In FIG. 4, only the images provided by the second camera 22 are displayed in the upper rectangular frames. However, the images provided by the first camera 20 may be displayed in the lower rectangular frames simultaneously.

Analysis Example Based on the Function (4)

Figure 5:
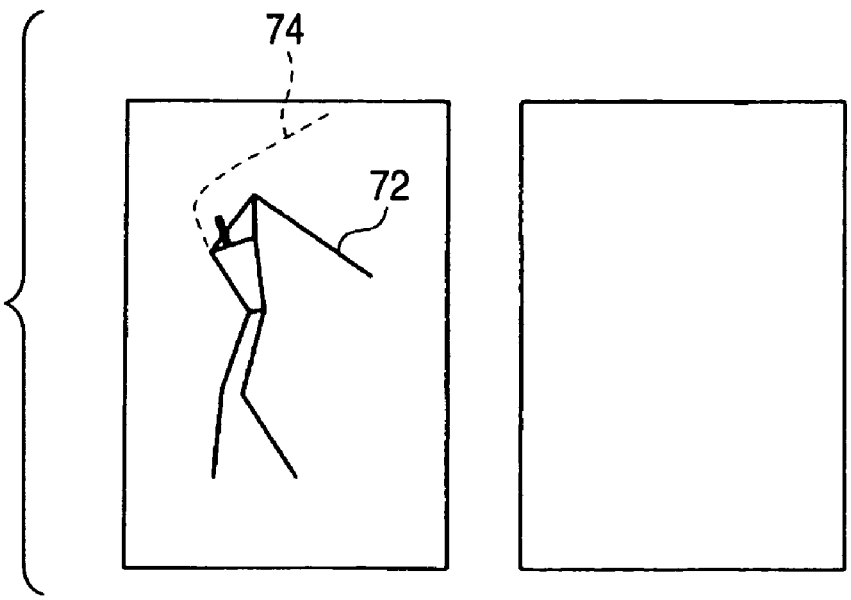
FIG. 5 is an explanatory view showing an analysis example of swing motion by the system shown in FIG. 1.

As shown in FIG. 5, two images (videos) 72 and 74 in the video of the swing motion are superposed on each other on the same screen and one image 74 is made translucent (indicated by the dotted line), to thereby enable the user to recognize the two images (videos) on the same screen.

Analysis Example Based on the Function (8)

Figure 6:
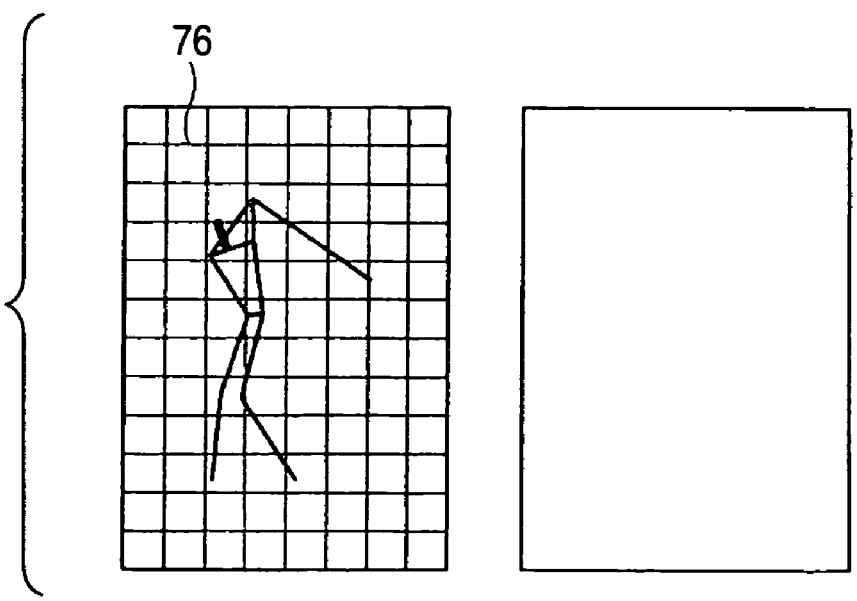
FIG. 6 is an explanatory view showing an analysis example of swing motion by the system shown in FIG. 1.

A grid line 76 is displayed on the screen on which the video of swing motion is displayed, as shown in FIG. 6.

Analysis Example Based on Function (8)

Figure 7:
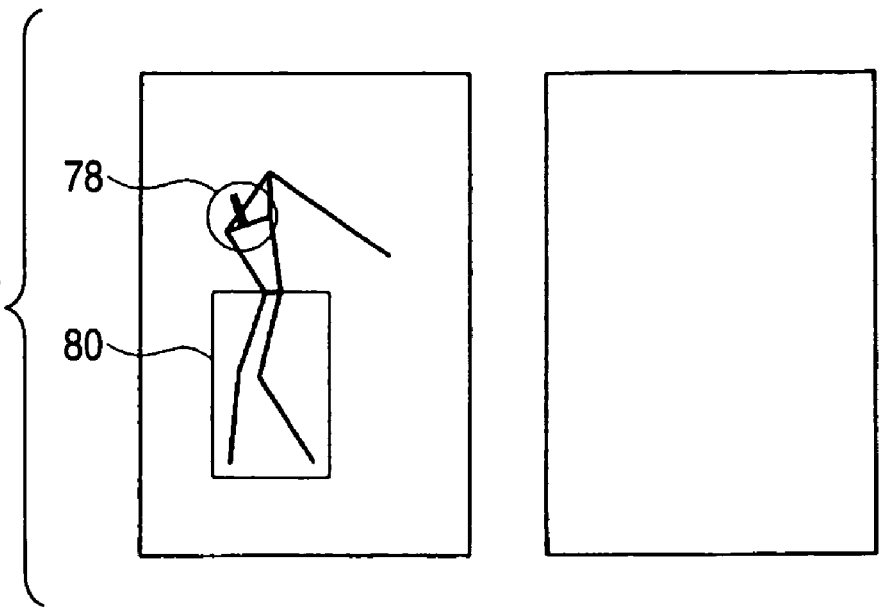
FIG. 7 is an explanatory view showing an analysis example of swing motion by the system shown in FIG. 1.

Any desired patterns such as a circle 78 and a rectangle 80 are displayed on the screen on which the video of the swing motion is displayed, as shown in FIG. 7.

Analysis Example Based on the Function (9)

Figure 8:
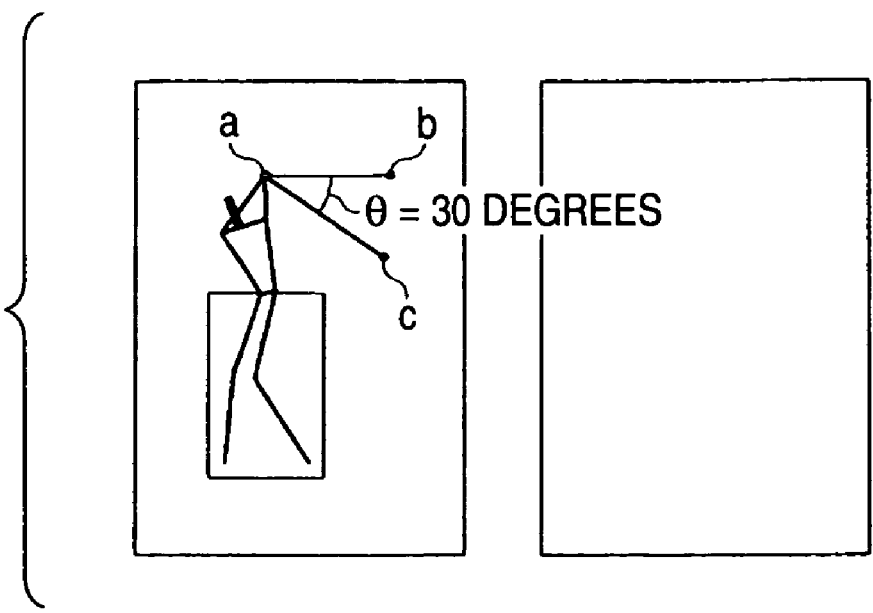
FIG. 8 is an explanatory view showing an analysis example of swing motion by the system shown in FIG. 1.

Three points a, b, and c within the screen on which the video of the swing motion is displayed are set and angle θ between two straight lines connecting the three points is calculated and is displayed, as shown in FIG. 8.

Figure 9:
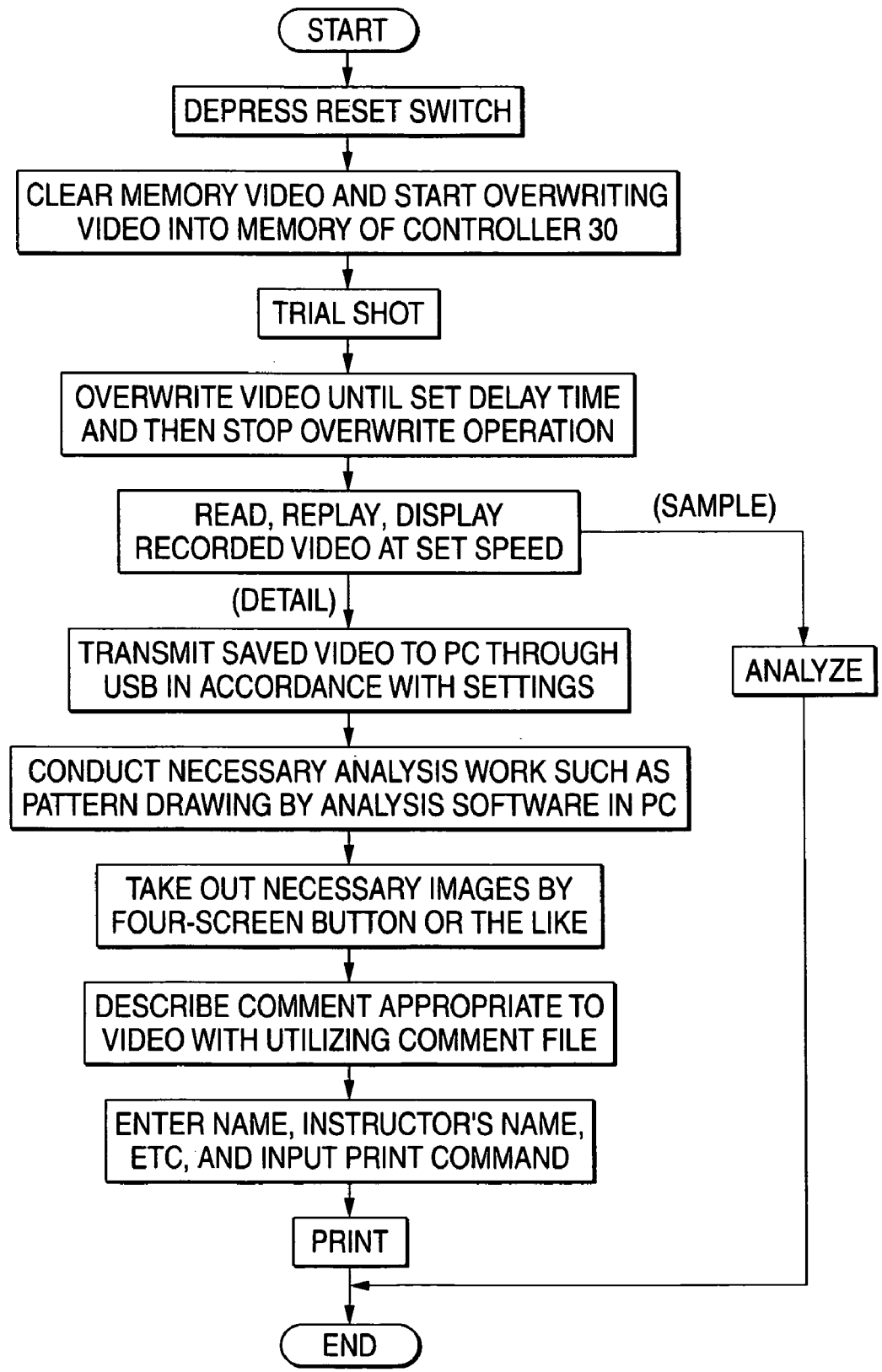
FIG. 9 is an operation flowchart showing an example of an analysis flow of swing motion by the system shown in FIG. 1.

FIG. 9 shows an example of an analysis flow of swingmotion by this system described above. However, the operation flow of this system is not limited to that shown in FIG. 9.

In FIGS. 5 to 8, only the images (videos) provided by the second camera 22 are displayed in the left rectangular frames, but the images (videos) provided by the first camera 20 may be displayed in the right rectangular frames simultaneously. The images (videos) provided by the first camera 20 and the second camera 22 may be displayed in the left and right rectangular frames side by side or images (videos) of different golfers recorded by the same camera may be displayed in the left and right rectangular frames side by side.

Further, the system of this example may be provided with a behavior analysis system of a hit ball so that ball behavior data of the ball hit result and the video of swing motion, which is a cause of ball behavior, can be determined totally. In this case, a known system can be used as the behavior analysis system. The screen on which the video of swing motion is displayed may be printed on a sheet of paper by a printer.

What is claimed is:

1. A video analysis system for analyzing video of a swing motion for hitting a ball, the video analysis system comprising:
    an imaging unit that records video of the swing motion;
    an impact detection unit that detects impact with the ball;
    a video display unit;
    a control unit that performs functions (a) to (h):
        (a) receiving the video of the swing motion from the imaging unit;
        (b) receiving an impact detection signal from the impact detection unit;
        (c) recording the video of the swing motion received from the imaging unit into the control unit;
        (d) in response to the control unit recording the video of the swing motion received from the imaging unit, determining an impact time based on the impact detection signal received from the impact detection unit and recording images of the swing motion for a predetermined time period that includes the impact with the ball;
        (e) displaying the video of the swing motion received from the imaging unit; on the video display unit;
        (f) while displaying the video of the swing motion on the video display unit, slowing down replay speed of the video of the swing motion to be lower than an actual speed of the recorded swing;
        (g) while displaying the video of the swing motion on the video display unit, temporarily stopping the video; and
        (h) while displaying the video of the swing motion on the video display unit, switching video replay between a forward mode and a backward mode; and
    a personal computer that includes software that performs function (1):
        (1) designating frame numbers of the video at an address position, a top position, an impact position, and a finish position in an image memory, and capturing images at the address position, the top position, the impact position, and the finish position from the video of the swing motion in response to a menu selection, and displaying the four captured images on the same screen of the video display unit,
    wherein the control unit is connected to the personal computer,
    wherein the functions (a) to (h) are activated by the control unit, remotely from the personal computer, and performed by the control unit, and wherein the function (1) is activated by and performed automatically by the personal computer.

2. The system according to claim 1, wherein:
    the predetermined time period is a sum of 1.3 to 2.2 seconds before the impact with the ball and 0.8 to 2.2 seconds after the impact with the ball.

3. The system according to claim 1, wherein the control unit further performs function (i):
    (i) adjusting the predetermined time period when the control unit records the video of the swing motion by the function (d).

4. The system according to claim 1, wherein:
    the imaging unit comprises a first camera and a second camera, and
    the control unit further performs function (j):
    (j) switching among a first video of the first camera, a second video of the second camera, and a third video provided by center wiping of the first and second videos, and displaying the switched video on the video display unit.

5. The system according to claim 1, wherein the control unit further performs function (k):
    (k) switching between a live video and a stored video, and displaying the switched video on the video display unit.

6. The system according to claim 1, wherein the control unit further performs function (l):
    (l) erasing the recorded video of the swing motion from the control unit.

7. The system according to claim 1, wherein:
    the control unit further performs function (m):
    (m) a function of transmitting the video of the swing motion to the personal computer,
    wherein the personal computer is connected to the control unit, and
    the control unit transmits the video of the swing motion to the personal computer.

8. The system according to claim 7, wherein:
    the control unit further comprises a plurality of buttons and a plurality of switches on an outer surface thereof,
    when at least one of the buttons is depressed, the control unit activates a function corresponding to the at least one depressed button, when at least one of the switches is operated, the control unit activates a function corresponding to the at least one operated switch, and a total number of the buttons and the switches provided on the outer surface of the control unit is 20 or less.

9. The system according to claim 8, wherein the total number of the buttons and the switches provided on the outer surface of the control unit is 10 or less.

10. The system according to claim 7, wherein the video of the swing motion transmitted to the personal computer by the control unit includes at least one of a live video and a video recorded in the control unit.

11. The system according to claim 8, wherein:
the control unit further comprises a communication interface through which the video of the swing motion is transmitted from the control unit to the personal computer, and
the communication interface complies with a USB standard.

12. The system according to claim 11, wherein:
a CPU clock frequency of the personal computer is equal to or higher than 1 GHz, and
the communication interface complies with a USB 2.0 standard having 480 Mbps in data transmission speed.

13. The system according to claim 1, wherein the software performs functions (2) to (3):
(2) arranging the four captured images in a predetermined display format when displaying the four images on the same screen of the video display unit while generating a comment on the video of the swing motion by calling the comment from a previously created comment file and adding and registering a newly created comment to the comment file, and displaying the comment in the display format; and
(3) permitting entry of a name of a golfer and a name of an instructor in the display format and recording the names of the golfer and the instructor.

14. The system according to claim 1, wherein the software performs at least one of functions (4) to (12):
(4) superposing two images in the video of the swing motion on each other on the same screen and making one of the images translucent, enabling a user to simultaneously view the two images on the same screen;
(5) switching between the video provided by one camera of the imaging unit and the videos provided by two cameras of the imaging unit for display;
(6) receiving a first video provided by a first camera of the imaging unit and a second video provided by a second camera of the imaging unit from the control unit and aligning top positions of the first and second videos, thereby displaying the first and second videos in synchronization with each other;
(7) displaying a scale on the screen on which the video of the swing motion is displayed;
(8) displaying a line selected from among a circle, an ellipse, a straight line, a rectangle, a free-form curve, and a grid line on the screen on which the video of the swing motion is displayed;
(9) setting three points within the screen on which the video of the swing motion is displayed and calculating and displaying an angle between two straight lines connecting the three points;
(10) saving a file of the video of the swing motion received from the control unit;
(11) compressing and saving a file of the video of the swing motion received from the control unit; and
(12) making a printer print the screen on which the video of the swing motion is displayed.

15. The system according to claim 1, further comprising a behavior analysis system of a hit ball so that ball behavior data, which is a ball hit result, and the video of the swing motion, which is a cause of ball behavior, can be determined.

* * * * *